United States Patent
Kerselaers et al.

(10) Patent No.: US 10,812,199 B1
(45) Date of Patent: Oct. 20, 2020

(54) QUALITY-FACTOR CONTROL FOR A NEAR-FIELD WIRELESS DEVICE

(71) Applicant: NXP B.V., Eindhoven (NL)

(72) Inventors: Anthony Kerselaers, Herselt (BE); Liesbeth Gommé, Anderlecht (BE)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/553,457

(22) Filed: Aug. 28, 2019

(51) Int. Cl.
| | |
|---|---|
| *H04B 17/10* | (2015.01) |
| *H04B 5/00* | (2006.01) |
| *H01Q 7/00* | (2006.01) |
| *H04B 17/318* | (2015.01) |
| *H04B 1/16* | (2006.01) |

(52) U.S. Cl.
CPC ............. *H04B 17/10* (2015.01); *H01Q 7/005* (2013.01); *H04B 5/0075* (2013.01); *H04B 17/318* (2015.01); *H04B 1/16* (2013.01)

(58) Field of Classification Search
CPC .... H04B 17/10; H04B 5/0075; H04B 17/318; H04B 1/16; H01Q 7/005
USPC ......................................................... 455/41.1
See application file for complete search history.

(56) References Cited

U.S. PATENT DOCUMENTS

| | | | |
|---|---|---|---|
| 6,980,782 B1 * | 12/2005 | Braun | H01Q 1/242 455/121 |
| 8,838,162 B2 | 9/2014 | Sun et al. | |
| 9,577,714 B2 | 2/2017 | Rehm | |
| 10,277,267 B1 | 4/2019 | Kerselaers | |
| 10,355,791 B1 | 7/2019 | Kerselaers et al. | |
| 2003/0083088 A1 * | 5/2003 | Chang | H04W 28/22 455/522 |
| 2016/0241230 A1 * | 8/2016 | Siebler | H03K 17/0412 |

\* cited by examiner

*Primary Examiner* — Eugene Yun

(57) ABSTRACT

One example discloses a near-field wireless device, including: a near-field antenna; a variable current source; a controller coupled to the near-field antenna and the variable current source; wherein the controller is configured to measure a transmit quality-factor (Qtx) of the near-field antenna; and wherein the controller is configured to increase current sent by the variable current source to the near-field antenna if the measured Qtx is lower than a minimum Qtx.

19 Claims, 6 Drawing Sheets

QUALITY-FACTOR CONTROL FOR A NEAR-FIELD WIRELESS DEVICE

The present specification relates to systems, methods, apparatuses, devices, articles of manufacture and instructions for wireless near-field device quality-factor control.

SUMMARY

According to an example embodiment, a near-field wireless device, comprising: a near-field antenna; a variable current source; a controller coupled to the near-field antenna and the variable current source; wherein the controller is configured to measure a transmit quality-factor (Qtx) of the near-field antenna; and wherein the controller is configured to increase current sent by the variable current source to the near-field antenna if the measured Qtx is lower than a minimum Qtx.

In another example embodiment, the controller is configured to set an upper limit to the current increase so as to keep the near-field antenna from emitting signals above a set of legal limits.

In another example embodiment, the controller is configured to decrease current sent by the variable current source to the near-field antenna if Qtx is above the minimum Qtx.

In another example embodiment, the variable current source includes a set of amplifiers arranged in parallel to each other.

In another example embodiment, the current sent to the near-field antenna is increased or decreased by switching in or out one or more of the amplifiers.

In another example embodiment, the amplifiers are current amplifiers.

In another example embodiment, half of the current amplifiers are coupled to a first feed point of the near-field antenna and another half of the current amplifiers are coupled to a second feed point of the near-field antenna.

In another example embodiment, the near-field antenna includes a set of feed points; further comprising a set of voltage sense lines coupled from the feed points to the controller; and wherein the controller is configured to measure channel or signal voltages on the voltage sense lines and calculate the measured Qtx based on the measured channel or signal voltages.

In another example embodiment, the measured channel or signal voltages are 3 dB lower than a maximum channel or signal voltage.

In another example embodiment, the voltages on the voltage sense lines is based on the current sent by the variable current source to the near-field antenna.

In another example embodiment, the controller is configured to obtain a received signal strength (RSS) measurement corresponding to a signal transmitted by the near-field device; and if the measured RSS is above a minimum RSS, the controller is configured to not increase the current sent by the variable current source to the near-field antenna even if the measured Qtx is lower than the minimum Qtx.

In another example embodiment, if the measured RSS is below the minimum RSS, the controller is configured to increase the current sent by the variable current source to the near-field antenna.

In another example embodiment, the device further comprises a receiver circuit; and the controller is coupled to and configured to obtain the RSS measurement from the receiver circuit.

In another example embodiment, the minimum RSS is above a noise floor of the receiver circuit.

In another example embodiment, the near-field antenna is a first near-field antenna; the receiver circuit is coupled to a second near-field antenna; and the controller is coupled to obtain the RSS measurement from second near-field antenna.

In another example embodiment, the near-field device is a first near-field device; and the controller is configured to obtain the RSS measurement by requesting the RSS measurement from a second near-field device configured to receive communications signals transmitted by the first near-field device.

In another example embodiment, the controller is configured to presume that the measured RSS is below the minimum RSS if the second near-field device does not respond to the RSS measurement request from the first near-field device.

In another example embodiment, further comprising a tuning circuit coupled to the controller; wherein the tuning circuit includes a set of tuning elements configured to adjust Qtx; and wherein the controller is configured to increase Qtx using the tuning circuit.

In another example embodiment, the tuning elements include a set of variable resistors; and the controller is configured to increase Qtx using the variable resistors.

In another example embodiment, the near-field antenna is configured to receive and transmit non-propagating quasi-static electric and/or magnetic near-field signals.

The above discussion is not intended to represent every example embodiment or every implementation within the scope of the current or future Claim sets. The Figures and Detailed Description that follow also exemplify various example embodiments.

Various example embodiments may be more completely understood in consideration of the following Detailed Description in connection with the accompanying Drawings.

Figure 2:
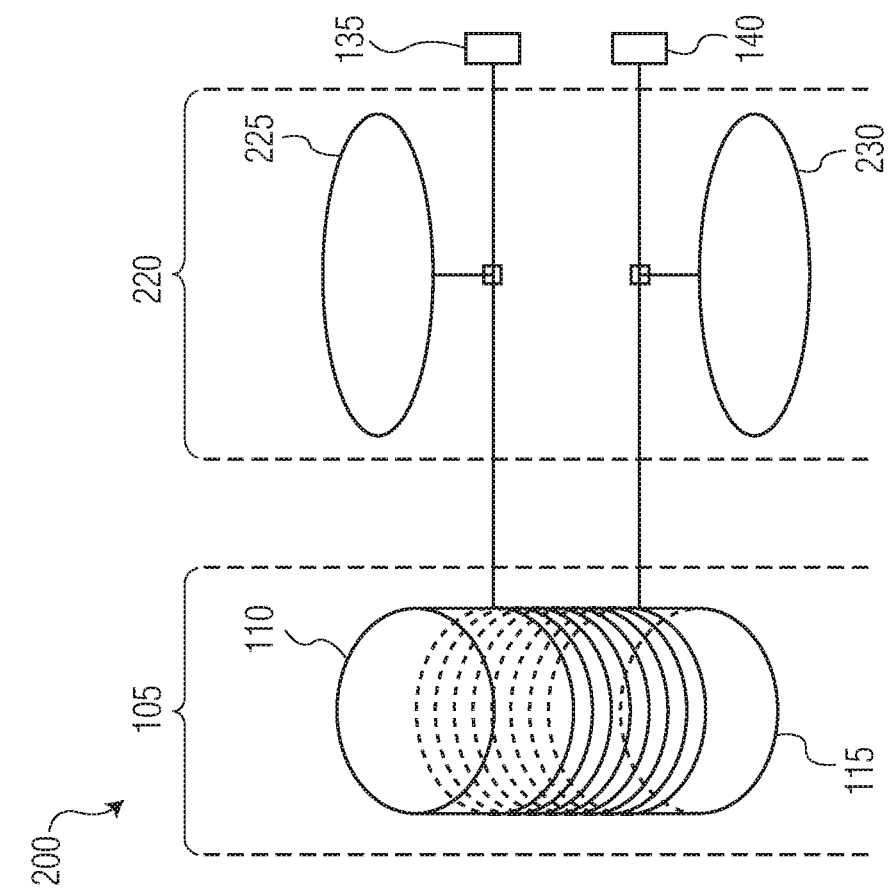
FIG. 2 is an example of a second near-field antenna in a second near-field wireless device.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

DETAILED DESCRIPTION

Herein discussed are near-field interactions between a near-field device on a user's body, for example, and other conductive surfaces and/or other wireless networked devices (e.g. Internet of Things (IoT) devices) based on near-field electromagnetic induction (NFEMI), where the transmitter and receiver are coupled by both magnetic (H) and electric (E) fields. While RF wireless communication is accomplished by propagating an RF plane wave through free space, NFEMI communication utilizes non-propagating quasi-static H and E fields.

An H-field antenna (i.e. magnetic antenna) is primarily sensitive to magnetic fields and/or primarily initiates magnetic fields when driven by a current. Any E-field component from an H-field antenna is strongly reduced (e.g. −20 to −60 dB reduction, a factor of 0.1 to 0.0008 (10% to 0.08%) depending on the antenna design).

A small loop antenna is an example H-field antenna and includes a loop antenna with dimensions much smaller than the wavelength of its use. The small loop antenna does not resonate at the NFEMI carrier frequency but is instead tuned to resonance by an external reactance. In some example embodiments the current in the small loop antenna has in every position of the loop the same value.

An E-field antenna (i.e. electric antenna) is primarily sensitive to electric fields and/or primarily initiates electric fields when driven by a voltage. Any H-field component from an E-field antenna is strongly reduced (e.g. −20 to −60 dB reduction, a factor of 0.1 to 0.0008 (10% to 0.08%) depending on the antenna design).

A short loaded dipole antenna is an example E-field antenna and includes a short dipole with dimensions much smaller than the NFEMI carrier frequency and in some example embodiments has extra capacitance surfaces at both ends.

The quasi-static characteristic of these fields is a result of the NFEMI antenna dimensions in combination with their carrier frequencies. Most of the near-field energy is stored in the form of magnetic and electric fields, while a small amount of RF energy inevitably propagates in free space. Small antenna geometries minimize radiating waves in free space.

Some wearables, such as hearing aids and wireless earbuds, employ Near-Field Magnetic Induction (NFMI) as a wireless communication method. In NFMI wireless communication, two loosely coupled coils realize signal transfer. No radiation of radio waves takes place. A current flowing in the transmission coil generates a H-field which in turn induces a current in the receiving coil. In this way, wireless communication is accomplished. Unfortunately, H-field based NFMI systems with small antenna coils have a limited range that may be much smaller than an entire wearable user's body. Such H-field communications are sensitive to coil orientation. In the case of a hearing aid form factor, a H-field induction based system cannot cover an entire human body. However, since in hearing aids both coils are always aligned with each other, they are not influenced by the movement of the human body.

Other wearables employ Near-field Electric Induction (NFEI)) as a wireless communication method. NFEI allows electronic devices on and near a conductive surface (e.g. a human body) to exchange information through E-field coupling (e.g. at 21 MHz). NFEI is also sometimes called Body Coupled Communication (BCC). While E-field based NFEI signals can have a greater range than H-field based NFMI signals, the E-field signal strength can vary with regard to body posture and is sensitive to body movements. The body can even partially block a capacitive return path, thereby increasing E-field channel loss and reliable and robust wireless communication is not possible.

Figure 1:
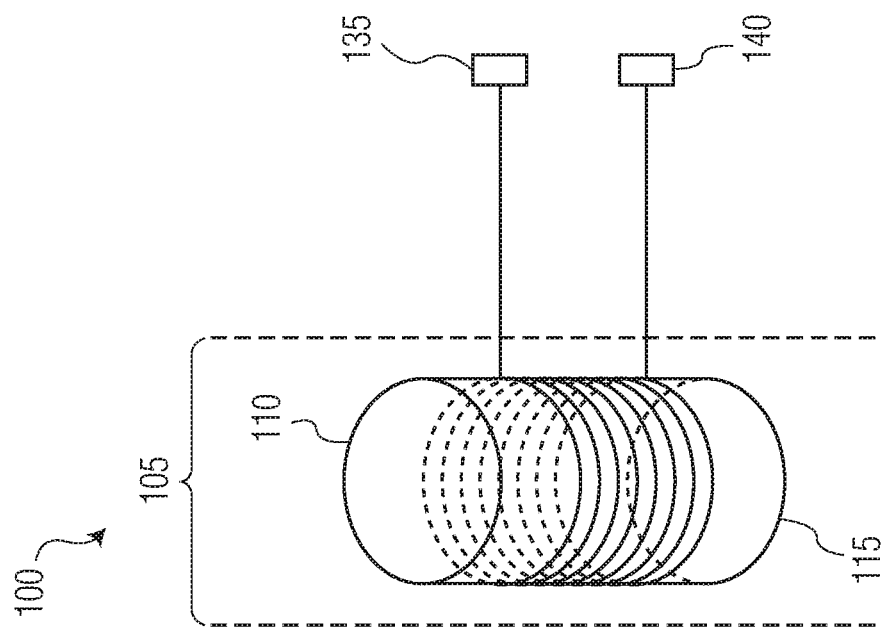
FIG. 1 is an example of a first near-field antenna in a first near-field wireless device.

FIG. 1 is an example of a first near-field antenna 100 in a first near-field wireless device. In this example the antenna 100 is a near-field magnetic induction (NFMI) antenna. The antenna 100 includes a coil (H-field) antenna 105 for magnetic fields. The H-field antenna 105 includes a ferrite core 110 wound with wire 115. Antenna 100 feed points 135, 140 are coupled to various transceiver circuitry, such as a downstream radio transmitter and receiver integrated circuit (RF-IC), (not shown here). The antenna 100 can be tuned to resonate at a communication frequency by means of reactance elements/components (e.g. capacitors (C-bank)) that are integrated in the RF-IC. The antenna's 100 bandwidth and quality-factor (Q) can similarly be tuned using the reactance elements/components (e.g. resistors (R-bank)).

FIG. 2 is an example of a second near-field antenna 200 in a second near-field wireless device. In this example the antenna 200 is a near-field electromagnetic induction (NFEMI) antenna. The antenna 200 includes the coil (H-field) antenna 105 for magnetic fields, in conjunction with a short loaded dipole (E-field) antenna 220 for electric fields. The H-field antenna 105 includes a ferrite core 110 wound with wire 115. The E-field antenna 220 includes two conductive loading surfaces 225 and 230. Antenna 200 feed points 135, 140 also can be coupled to various transceiver circuitry, such as a downstream radio transmitter and receiver integrated circuit (RF-IC), (not shown here). The antenna 200 can also be tuned to resonate at a communication frequency by means of reactance elements/components (e.g. capacitors (C-bank)) that are integrated in the RF-IC. The antenna's 200 bandwidth and quality-factor (Q) can similarly be tuned using the reactance elements/components (e.g. resistors (R-bank)).

When the NFEMI antenna 200 is proximate to a conductive structure (e.g. a structure having one or more conductive surfaces, a body, a person, an object, etc.) the magnetic and electric fields will be substantially confined to the conductive surface and not significantly radiate in free-space. This enhances security and privacy of such body networked communications.

In various example embodiments, the antenna 200 operates at or below 50 MHz (e.g. for example at 30 MHz) to ensure that the fields are following the conductive surface's contours and to ensure that far field radiation is strongly reduced.

Figure 3:
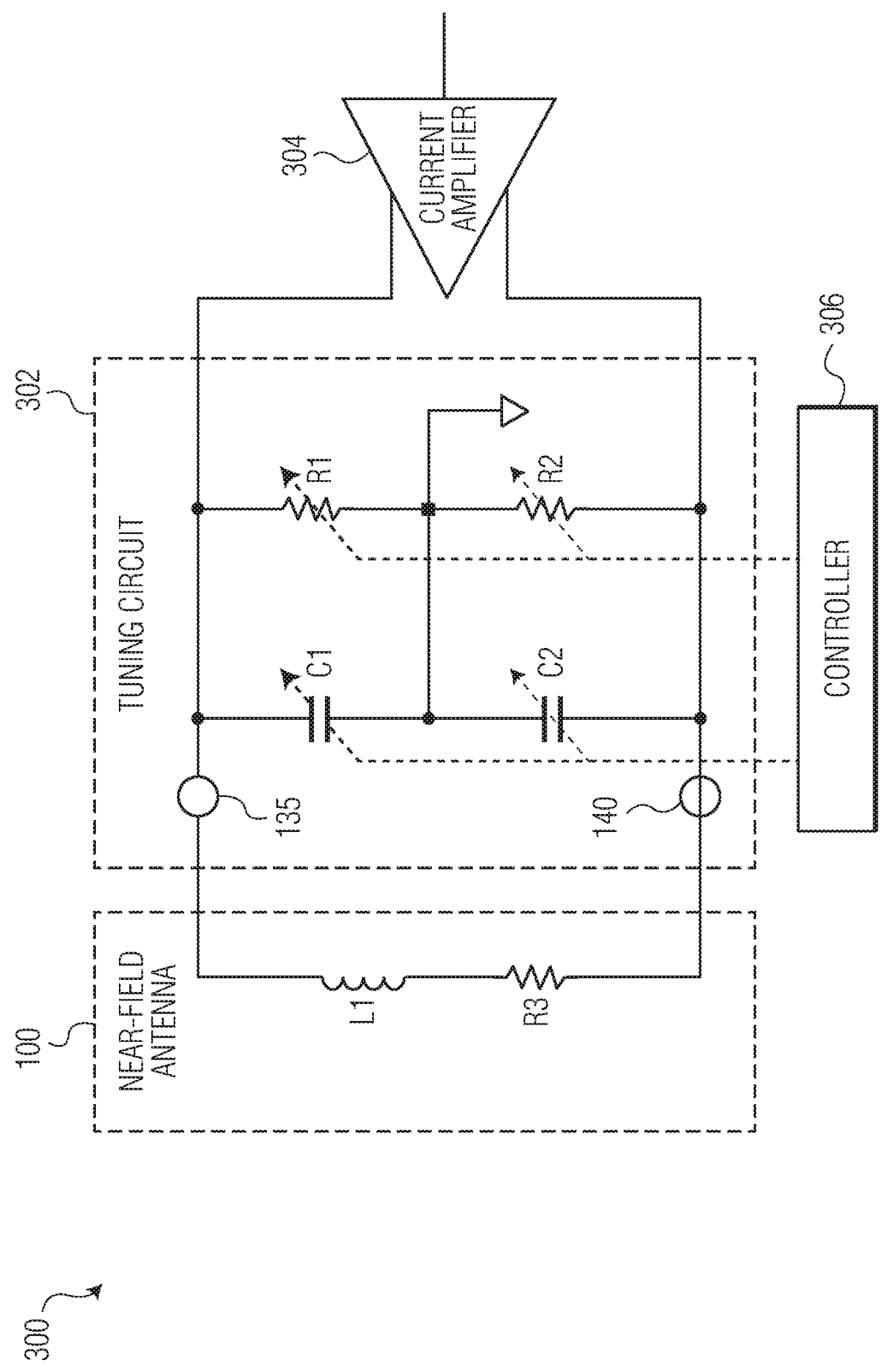
FIG. 3 is an example idealized electrical equivalent of the first near-field antenna configured to transmit communications signals in the first near-field device.

FIG. 3 is an example 300 idealized electrical equivalent of the first near-field antenna 100 configured to transmit communications signals in the first near-field device. The example 300 includes a tuning circuit 302, a current amplifier 304 and a controller 306.

The first near-field antenna 100 shows an inductance (L1) of the coil antenna 105 and resistive loss (R3) within the wire 115. The tuning circuit 302 includes variable capacitors C1 and C2 and variable loading resistors R1 and R2. The current amplifier 304 supplies a communications signal modulated current to the near-field antenna 100 that creates a voltage across the feed points 135, 140.

The controller 306 tunes the antenna's 100 resonance frequency (e.g. 10.6 MHz) using the variable capacitors C1 and C2 (i.e. C-bank). The controller 306 tunes the antenna's 100 bandwidth (e.g. 400 KHz) and quality-factor (Q) using the variable loading resistors R1 and R2 (i.e. R-bank).

Figure 4:
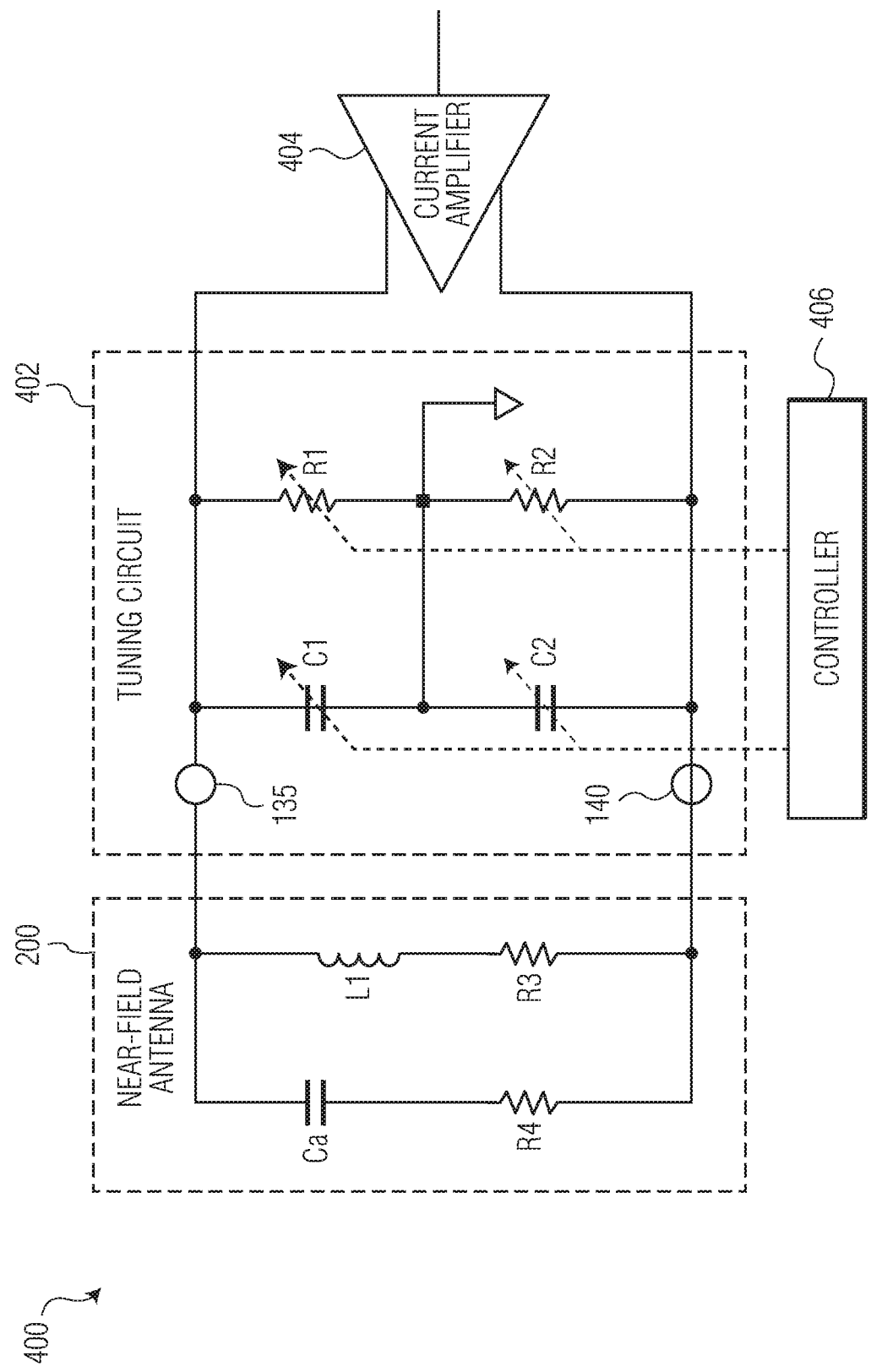
FIG. 4 is an example idealized electrical equivalent of the second near-field antenna configured to transmit communications signals in the second near-field device.

FIG. 4 is an example 400 idealized electrical equivalent of the second near-field antenna 200 configured to transmit communications signals in the second near-field device. The example 400 includes a tuning circuit 402, a current amplifier 404 and a controller 406.

The second near-field antenna 200 shows an inductance (L1) of the coil antenna 105, resistive loss (R3) within the wire 115, capacitance (Ca) of the conductive surfaces 225, 230 and resistive loss (R4) of the short loaded dipole (E-field) antenna 220. The tuning circuit 402 includes variable capacitors C1 and C2 and variable loading resistors R1 and R2. The current amplifier 404 supplies a communications signal modulated current to the near-field antenna 200 that creates a voltage across the feed points 135, 140.

The controller 406 tunes the antenna's 200 resonance frequency (e.g. 10.6 MHz) using the variable capacitors C1 and C2 (i.e. C-bank). The controller 406 tunes the antenna's 200 bandwidth (e.g. 400 KHz) and quality-factor (Q) using the variable loading resistors R1 and R2 (i.e. R-bank). An adjustment range of the C-bank capacitors is limited by a physical size of the capacitors. An adjustment range of the R-bank resistors is limited by their leakage currents.

Figure 5:
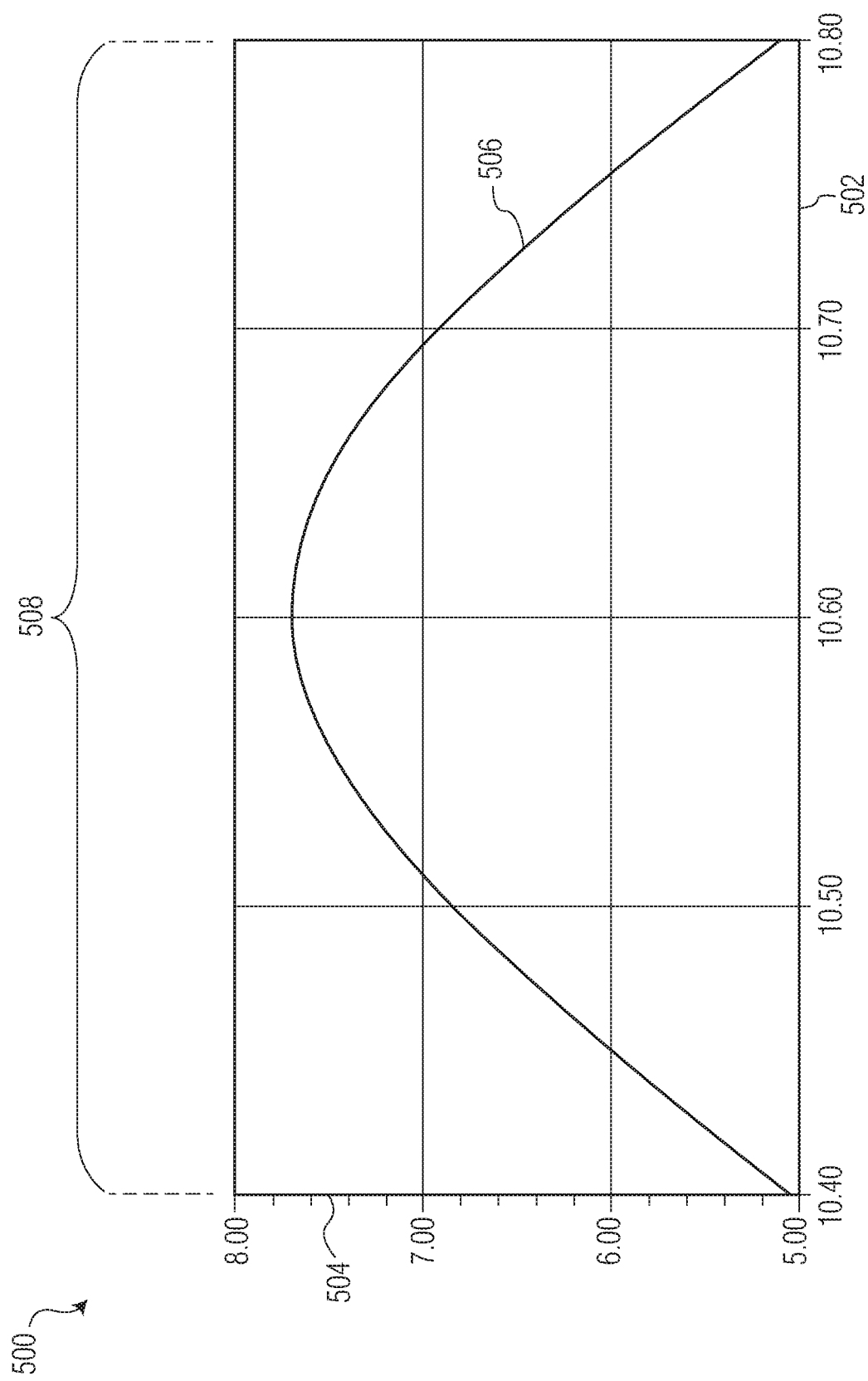
FIG. 5 is an example frequency response graph of the second near-field antenna communications channel for transmitting communications signals through the second near-field device.

FIG. 5 is an example frequency response graph 500 of the second near-field antenna 200 communications channel 508 for transmitting the communications signals through the second near-field device. A horizontal axis 502 displays the frequency in MHz and a vertical axis 504 displays the voltage in dBV across the feed points 135, 140. The frequency response curve 506 for the channel 508 is also shown. The communications channel 508 in this example embodiment is defined by the frequency response curve's 506 3 dBV points.

In this example, the second near-field antenna 200 is tuned at 10.6 MHz with a channel bandwidth 508 of 400 KHz and has a transmit quality-factor (Qtx) is defined as:

$$Q_{tx} = \frac{Fr}{BW_{tx}}$$

Where Fr is the communication frequency (MHz) and BW is the channel bandwidth 508 (MHz). In this specific example the Qtx is 26.5. The channel bandwidth 508 is important to allow to pass the communication signal without distortion.

The antenna also has an intrinsic quality-factor ($Q_a$) (based on its innate physical structure, and resistive losses R3 and R4) defined as:

$$Q_a = \frac{Fr}{BW_a}$$

Where Fr is the resonance frequency (MHz) and BWa is the channel bandwidth (MHz). For example, a near-field antenna may have an intrinsic quality-factor of 50.

Qtx and the transmit current must not be too high or else spurious emissions will be generated by the near-field device's antenna that will exceed legal limits. For example, in Europe the ETSI-EN3003301V1.7.1 (2010-02) standard describes the limits for far field spurious emission limits. In the United States the FCC-subpart-C15.209 standard describes the limits for far field spurious emissions.

Far field emissions of near-field antennas can also be caused by small currents induced in a user wearing the near-field device. In some examples, this is because the user's body acts as an efficient antenna in the frequency range between 70 and 150 MHz, and spurious currents within this frequency range will generate an unwanted far field emissions. For example, with a communication frequency of 10.6 MHz, spurious emissions will be generated at all its harmonics, 21.2 MHz, 31.8 MHz . . . and in the 70 to 150 MHz frequency range.

Qtx must also not be too low or else a received signal strength (RSS) at other near-field devices will be reduced resulting in a signal-to-noise (SNR) that is inadequate for reliable data communications.

In various example embodiments, during near-field device manufacture, the current sent to the second near-field antenna 200 is fixed at a maximum that will not exceed legal spurious emissions limits, but which will provide as robust a SNR at receiving near-field devices as possible.

While the fixed current sent by the current amplifier 404 to the second near-field antenna 200 correlates to an idealized/target Qtx (assuming ideal conditions), during actual near-field device operations, the second near-field antenna 200 can be from time to time coupled to a plurality of conductive structures. Some of these conductive structures couplings are desirable for enabling communications; however, some of these conductive structures couplings are parasitic (e.g. unwanted). These parasitic couplings (being non-ideal) skew Qtx from its idealized/target Qtx.

If Qtx is too high, the R-bank resistors in the tuning circuit 402 can within limits decrease Qtx back to within a nominal operational range (e.g. reducing Qtx from 50 to 26.5). Similarly if Qtx is too low, the R-bank resistors in the tuning circuit 402 can within limits increase Q back to within the nominal Q range.

In some real-world (non-idealized) near-field device operations/applications, Qtx can drop so low and so quickly (e.g. depending upon a user's body movements) that the R-bank resistors in the tuning circuit 402 are not able to increase Q back to within the nominal Q range.

Examples where Q can decrease quickly and significantly include: hearing aid and earbud applications where a user places a smart phone too close to the hearing aid or earbud. In such a case the NFMI antenna will be close to the conductive structures of the smart phone and the quality-factor of the NFMI antenna may undesirably decrease below 26.5, for example to 15. Another example is when a communication device uses a NFEMI antenna implemented in a wristband. When the user wrist is close to a metallic object, or behind a person's back, the quality-factor of the antenna may drop down below the required value.

Now discussed are specific circuits and techniques for increasing the transmit quality-factor (Qtx) if below a nominal operational range, that also does not violate any legal spurious emissions limits. These circuits and techniques can quickly and significantly increase a current sent to the near-field device's antenna when below the nominal Qtx range, and similarly can quickly and significantly decrease the current sent to the near-field device's antenna when Qtx returns to within the nominal Qtx range so as not to exceed any legal spurious emissions limits.

These circuits and techniques are applicable to near-field magnetic induction (NFMI) and near-field electro-magnetic near-field (NFEMI) communications devices.

Figure 6:
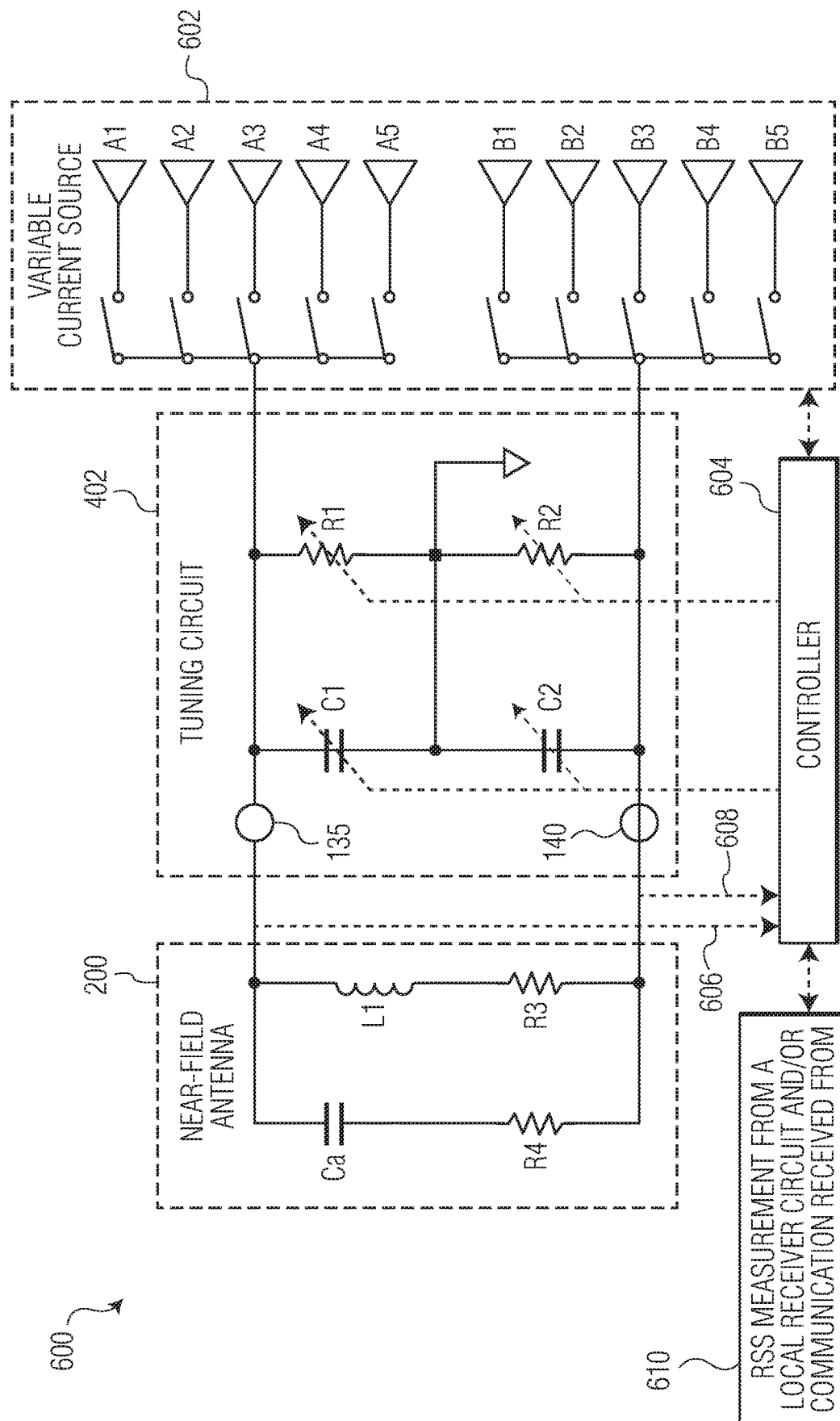
FIG. 6 is an example idealized electrical equivalent of the second near-field antenna configured to transmit communications signals in a third near-field wireless device.

FIG. 6 is an example 600 idealized electrical equivalent of the second near-field antenna 200 configured to transmit communications signals in a third near-field wireless device. The example 600 includes the tuning circuit 402, a variable current source 602 (e.g. a set of current amplifiers in parallel) and a controller 604.

The controller 604 in various example embodiments includes a set of voltage sense lines 606, 608 for monitoring the voltage across the near-field antenna 200, and is coupled to receive an RSS Measurement 610 from a Local Receiver Circuit and/or Communication Received from another Near- Field Device that receive the communications signals sent by the example 600 near-field device.

The controller 604 controls the tuning circuit 402 as discussed in FIG. 4; however, the controller 604 also controls the variable current source 602 (e.g. by switching in and out one or more of the current amplifiers (e.g. A1 to A5 and B1 to B5) arranged in parallel to each other) to further vary a total amount of current that is sent to the second near-field antenna 200.

This greater level of current control enables the controller 604 to compensate for substantial drops in Qtx by sending a much greater current to the second near-field antenna 200, but also to quickly compensate for substantial increases in Qtx by reducing the current sent to the second near-field antenna 200 so as not to violate legal emissions limits.

An increase in current results in an increase in voltage across the feed points 135, 140 of the second near-field antenna 200. The controller 604 in some examples includes a DSP (Digital Signal Processor).

Figure 7:
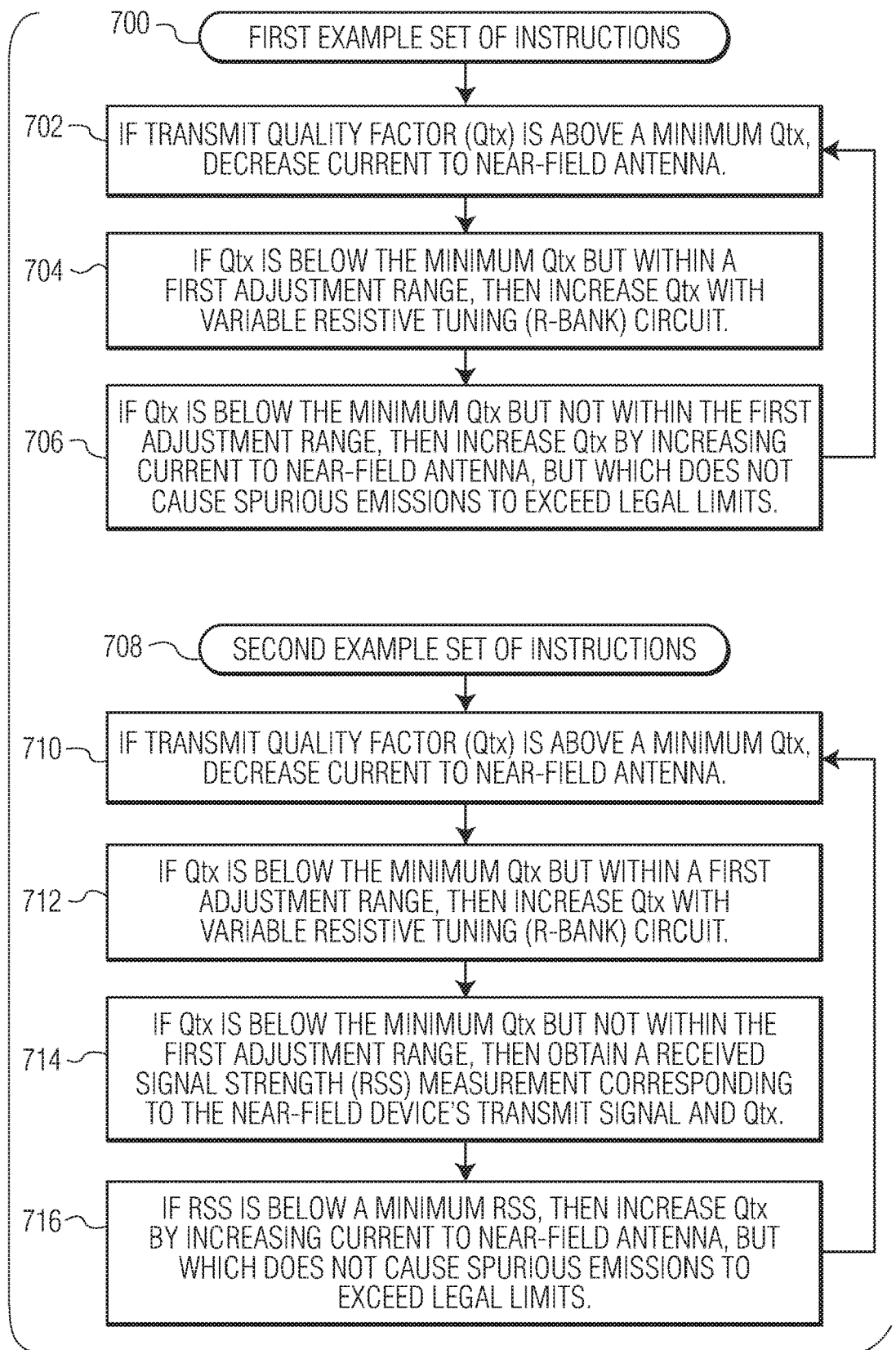
FIG. 7 is an example set of instructions and/or logic circuits for operating the third near-field wireless device.

FIG. 7 is an example set of instructions and/or logic circuits for the controller 604 operating the third near-field wireless device. The order in which the instructions are discussed does not limit the order in which other example embodiments implement the instructions unless otherwise specifically stated. Additionally, in some embodiments the instructions are implemented in parallel.

A first example instruction set 700 for the controller 604 begins in 702, where if a measured transmit quality factor (Qtx) is above a minimum Qtx, the controller 604 decreases the current to the second near-field antenna 200.

Next, in 704, if the measured Qtx is below the minimum Qtx but within a first adjustment range, then increase Qtx with variable resistive tuning (R-bank) circuit. Then in 706, if the measured Qtx is below the minimum Qtx but not within the first adjustment range, then increase Qtx by increasing the current sent to the second near-field antenna 200, but which does not cause spurious emissions to exceed legal limits. The controller 604 varies the current.

Thus, while initially the tuning circuit 402 (e.g. C-bank and R-bank) can try to compensate by increasing or decreasing Qtx, if the decrease in Qtx is too great the tuning circuit cannot fully increase Qtx to above the minimum Qtx and the controller 604 must adjust the variable current source 602 (e.g. switch in more current amplifiers) to boost the current sent to the second near-field antenna 200.

A second example instruction set 708 for the controller 604 begins in 710, where if the measured transmit quality factor (Qtx) is above a minimum Qtx, the controller 604 decreases the current to the second near-field antenna 200.

Next, in 712, if the measured Qtx is below the minimum Qtx but within a first adjustment range, then increase Qtx with variable resistive tuning (R-bank) circuit. Then in 714, if the measured Qtx is below the minimum Qtx but not within the first adjustment range, then the controller 604 obtains a received signal strength (RSS) measurement corresponding to the near-field device's transmit signal and Qtx.

The controller 604 can obtain the RSS measurement in a variety of ways. For example, the transmitting near-field device can request from another receiving near-field device the RSS measurement corresponding to the communications signals sent by the transmitting near-field device. Further, if the other near-field device does not respond to the RSS measurement request, the transmitting near-field device will presume that the RSS is below a minimum RSS. The minimum RSS can for example 5-10 dB be above a near-field device receiver's noise floor.

In another example, the antenna 200 is switched between the transmit tuning circuit 402 and a receiver circuit (not shown) which then measure the RSS.

In another example, the transmitting near-field device itself can have another near-field antenna coupled to the transmitting near-field device's own receiving circuit so as to receive the RSS measurement locally.

Then in 716, if the RSS is below the minimum RSS, the controller 604 increases Qtx by increasing current to the second near-field antenna 200, but which is limited to an upper current level that does not cause spurious emissions to exceed legal limits. In some example embodiments, any decrease in the quality factor, below a threshold reference level (e.g. the minimum Qtx), is linearly compensated with an increase in current to the antenna 200.

The circuits and techniques described above can be applied in various embodiments to wireless earbuds, hearing aids, wireless body networks, smart lock systems, identification industrial measurement systems, and IOT systems.

Various circuits, logic gates, modules, computers, etc. can host these instructions. Such systems can include an input/output data interface, a processor, a storage device, and a non-transitory machine-readable storage medium. The machine-readable storage medium includes the instructions which control how the processor receives input data and transforms the input data into output data, using data within the storage device. The machine-readable storage medium in an alternate example embodiment is a non-transitory computer-readable storage medium. In other example embodiments the set of instructions described above can be implemented either using logic gates, application specific chips, firmware, as well as other hardware forms.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

It will be readily understood that the components of the embodiments as generally described herein and illustrated in the appended figures could be arranged and designed in a wide variety of different configurations. Thus, the detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

What is claimed is:

1. A near-field wireless device, comprising:
a near-field antenna;
a variable current source;
a controller coupled to the near-field antenna and the variable current source;
wherein the controller is configured to measure a transmit quality-factor (Qtx) of the near-field antenna;
wherein the controller is configured to increase current sent by the variable current source to the near-field antenna if the measured Qtx is lower than a minimum Qtx;
wherein the controller is configured to obtain a received signal strength (RSS) measurement corresponding to a signal transmitted by the near-field device; and
wherein if the measured RSS is above a minimum RSS, the controller is configured to not increase the current sent by the variable current source to the near-field antenna even if the measured Qtx is lower than the minimum Qtx.

2. The device of claim 1:
wherein the controller is configured to set an upper limit to the current increase so as to keep the near-field antenna from emitting signals above a set of legal limits.

3. The device of claim 1:
wherein the controller is configured to decrease current sent by the variable current source to the near-field antenna if Qtx is above the minimum Qtx.

4. The device of claim 1:
wherein the variable current source includes a set of amplifiers arranged in parallel to each other.

5. The device of claim 4:
wherein the current sent to the near-field antenna is increased or decreased by switching in or out one or more of the amplifiers.

6. The device of claim 4:
wherein the amplifiers are current amplifiers.

7. The device of claim 6:
wherein half of the current amplifiers are coupled to a first feed point of the near-field antenna and another half of the current amplifiers are coupled to a second feed point of the near-field antenna.

8. The device of claim 1:
wherein the near-field antenna includes a set of feed points;
further comprising a set of voltage sense lines coupled from the feed points to the controller; and
wherein the controller is configured to measure channel or signal voltages on the voltage sense lines and calculate the measured Qtx based on the measured channel or signal voltages.

9. The device of claim 8:
wherein the measured channel or signal voltages are 3 dB lower than a maximum channel or signal voltage.

10. The device of claim 8:
wherein the voltages on the voltage sense lines is based on the current sent by the variable current source to the near-field antenna.

11. The device of claim 1:
wherein if the measured RSS is below the minimum RSS, the controller is configured to increase the current sent by the variable current source to the near-field antenna.

12. The device of claim 1:
wherein the device further comprises a receiver circuit; and
wherein the controller is coupled to and configured to obtain the RSS measurement from the receiver circuit.

13. The device of claim 12:
wherein the minimum RSS is above a noise floor of the receiver circuit.

14. The device of claim 12:
wherein the near-field antenna is a first near-field antenna;
wherein the receiver circuit is coupled to a second near-field antenna; and
wherein the controller is coupled to obtain the RSS measurement from second near-field antenna.

15. The device of claim 1:
wherein the near-field device is a first near-field device; and
wherein the controller is configured to obtain the RSS measurement by requesting the RSS measurement from a second near-field device configured to receive communications signals transmitted by the first near-field device.

16. The device of claim 15:
wherein the controller is configured to presume that the measured RSS is below the minimum RSS if the second near-field device does not respond to the RSS measurement request from the first near-field device.

17. The device of claim 1:
further comprising a tuning circuit coupled to the controller;
wherein the tuning circuit includes a set of tuning elements configured to adjust Qtx; and
wherein the controller is configured to increase Qtx using the tuning circuit.

18. The device of claim 17:
wherein the tuning elements include a set of variable resistors; and
wherein the controller is configured to increase Qtx using the variable resistors.

19. The device of claim 1:
wherein the near-field antenna is configured to receive and transmit non-propagating quasi-static electric and/or magnetic near-field signals.

* * * * *